United States Patent [19]

Tensor

[11] Patent Number: 5,788,247
[45] Date of Patent: Aug. 4, 1998

[54] COMPOSITE GASKET COMPRISING SURFACE FORMED TANGS

[75] Inventor: Paul M. Tensor, Lombard, Ill.

[73] Assignee: Dana Corporation, Toledo, Ohio

[21] Appl. No.: 764,364

[22] Filed: Dec. 12, 1996

[51] Int. Cl.$^6$ .................................................. F16J 15/12
[52] U.S. Cl. ................................. 277/235 B; 29/888.3
[58] Field of Search .......................... 277/233, 234, 277/235 B, 235 R, 213; 29/888.3

[56] References Cited

U.S. PATENT DOCUMENTS

| | | | |
|---|---|---|---|
| 1,068,585 | 7/1913 | Hettinger | 277/235 B |
| 1,789,030 | 1/1931 | Balfe | 277/235 B |
| 1,808,744 | 6/1931 | Hettinger | 277/235 B |
| 1,897,088 | 2/1933 | Victor | 277/235 B |
| 1,927,450 | 9/1933 | Balfe | 277/234 |
| 2,006,381 | 7/1935 | Bailey | 277/235 B |
| 2,011,563 | 8/1935 | Balfe | 277/235 B |
| 2,127,372 | 8/1938 | Victor et al. | 277/235 B |
| 2,197,916 | 4/1940 | Balfe | 277/235 B |
| 3,560,007 | 2/1971 | Ascencio | 277/235 B |
| 3,738,558 | 6/1973 | Colwell | |
| 4,234,638 | 11/1980 | Yamazoe et al. | |
| 4,477,094 | 10/1984 | Yamamoto et al. | |
| 4,485,138 | 11/1984 | Yamamoto et al. | 277/235 B |
| 4,591,170 | 5/1986 | Nakamura et al. | |
| 4,705,278 | 11/1987 | Locacius et al. | |
| 4,776,602 | 10/1988 | Gallo | |
| 4,813,687 | 3/1989 | Nakayama et al. | |
| 5,215,314 | 6/1993 | Nakaya | |

FOREIGN PATENT DOCUMENTS

| | | | |
|---|---|---|---|
| 258651 | 12/1967 | Austria | 277/235 B |
| 697239 | 9/1940 | Germany | 277/235 B |
| 883267 | 11/1961 | United Kingdom | 277/235 B |

*Primary Examiner*—Scott Cummings
*Attorney, Agent, or Firm*—Rader Fishman & Grauer PLLC

[57] ABSTRACT

A composite gasket including facing material and a core material. The core material includes tanged portions which are formed by disturbing a surface of the core. The tang portions preferably terminate into pointed tips which penetrate the facing material when it is forced against the tangs. When sufficient force is applied against the facing material, the pointed tips of the tangs deform inwardly forming hook shaped ends. These hook shaped ends help form and maintain an excellent mechanical bond between the core material and the facing material. The forming of the tangs does not penetrate completely through the thickness of the core material but simply forms a slight divot in the surface of the core material. Thus, there is no possibility of leakage through the core material.

13 Claims, 2 Drawing Sheets

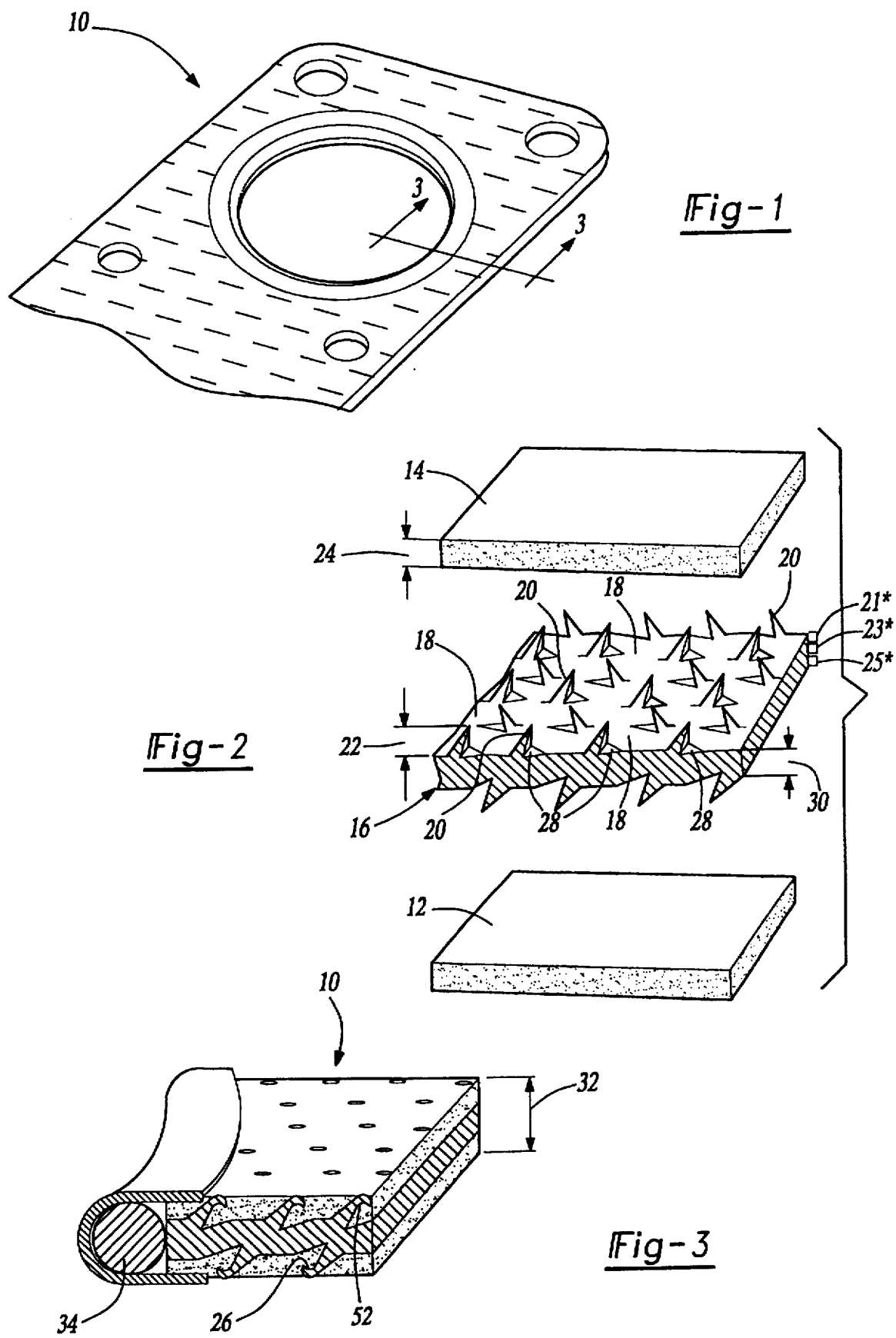

COMPOSITE GASKET COMPRISING SURFACE FORMED TANGS

FIELD OF THE INVENTION

The present invention relates to gaskets and more particularly relates to composite gaskets having metal cores.

BACKGROUND OF THE INVENTION

Many advancements have been made in extending the efficiency and durability of the internal combustion engine. Many of these improvements have been made possible, in part, by the materials used in gaskets used in the assembly of internal combustion engines. For example, it has been known for some time that the best way to seal the engine head to the engine block is by using a composite gasket. This composite gasket is typically constructed by using a metal core combined with a non-metal facing. The metal core gives the gasket its increased radial strength which is needed in cylinder head gasket applications and the non-metallic surface gives the gasket its superior sealing capabilities even under the extreme temperature conditions experienced by an internal combustion engine.

In spite of these advancements, there remains several unsolved problems in making composite gaskets. A primary problem relates to delamination failure. Typically, composite gaskets are made by placing an adhesive between the metal core and the facing material. Over a period of time, the heat cycles and the mechanical vibration experienced by composite gaskets used in internal combustion engines tend to break down the adhesive bond causing the facing material to separate from the metal core. Another problem experienced when adhesives are used to bond the facing material to the metal core relates to bonding effectiveness. Many of the materials which perform exceptionally well as a facing layer to not lend themselves to adhesive bonding. Specifically, graphite is one of these materials which has many favorable characteristics when incorporated into facing material; however, many attempts to bond the graphite impregnated facing material to a metal core have met with only limited success (in part because graphite is inherently weak and tends to weaken the structural integrity of any materials to which it is added).

In view of the drawbacks associated with adhesive bonding, some attempts have been made to mechanically attach the metal core to the facing material. Although such attempts have met with some success, the primary way in which the mechanical bonding has been accomplished is by perforating the metal core and passing a fastener through the perforation and the facing material. Some approaches have also perforated the metal core to form a tabbed fastener which is then folded up and into the facing material to clinch the facing material to the metal core. The primary drawback associated with this approach is that it introduces perforations which pass through the metal core and inherently weaken the metal core. Weak spots in the core are frequently the source of gasket leaks.

SUMMARY OF THE INVENTION

The present invention is directed to a composite gasket including facing material having at least one mating surface and a non-perforated core for fastening against the mating surface of the facing material. The non-perforated core includes a mating surface having generally planar portions and tanged portions that extend beyond the planar portions of the non-perforated core and into the facing material. The tanged portions are integral with the metal core and are formed from the metal core without forming perforation which pass through the metal core.

The present invention is also directed to a method for forming a composite gasket including a core portion and a facing portion. A surface of the core portion is disturbed such that a plurality of tang portions are produced without forming a resulting perforation which passes through the core portion. The facing portion of the gasket composite is pressed against the tangs such that the tangs penetrate the facing portion and clinch the facing portion to the core portion.

BRIEF DESCRIPTION OF THE DRAWINGS

The features and inventive aspects of the present invention will become more apparent upon reading the following detailed description, claims, and drawings of which the following is a brief description:

FIG. 1 is a first embodiment of the composite gasket of the present invention shown fully assembled.

FIG. 2 is an exploded view of a portion of the composite gasket of FIG. 1 wherein each of the three layers which make up the composite gasket are shown.

FIG. 3 is a partial cross sectional view taken substantially through lines 3—3 of FIG. 1.

DETAILED DESCRIPTION OF THE PREFERRED EMBODIMENT

Figure 4:
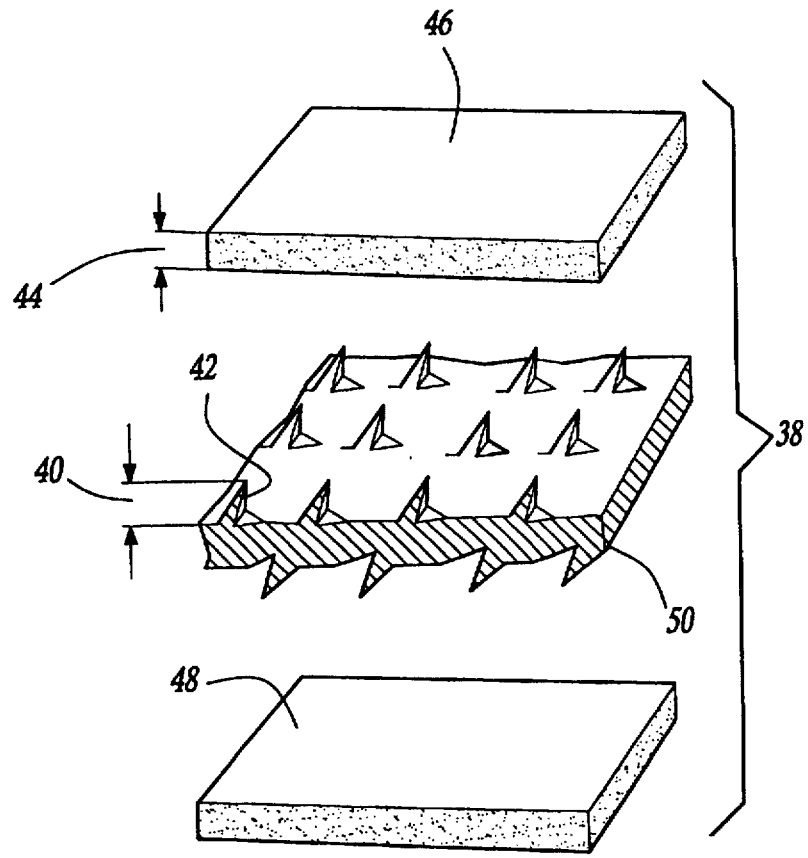
FIG. 4 is an exploded view of a portion of a second embodiment of the composite gasket of the present invention.

In a first embodiment 10 of the composite gasket of the present invention, as shown in FIG. 1, a portion of an engine head gasket is depicted.

Now referring to FIGS. 1–3, the composite gasket is comprised of non-metallic facing 12, 14 disposed on opposite sides of a sheet-like metal core 16. Although the composite gaskets of the present invention will be depicted having two layers 12, 14 of non-metallic facing, it is well understood to those skilled in the art that the present invention is equally as applicable to composite gaskets only requiring one non-metallic facing. Non-metallic facing 12, 14 is comprised of any number of materials (including graphite) which are well-known to those skilled in the art. Core 16 has an upper surface layer 21 adjacent a middle core layer 23, and a lower surface layer 25. Core 16 is preferably metal and includes portions which are generally planar 18 and portions which are generally raised and terminate into pointed projections 20. These pointed projections will be referred to throughout this disclosure as tangs. Tangs 20 are preferably formed in the upper and lower surface layers 21, 25 of core 16 by way of a gouging or scratching operation, and such a process step is well-known to those skilled in the art of metal forming. Once tangs 20 have been formed, non-metallic facing 14, 20 is pressed into tangs 20 using any conventional means such as a platen, roller combiner or the like. In the embodiment of FIGS. 1–3 tang height 22 is greater than thickness 24 of non-metal facing 14. This permits the end portion of tangs 20 to pass completely through non-metallic facing 14 and the pressure from the pressing operation causes the tip portion 26 of tangs 20 to be formed back into non-metallic facing 14 such that a curved hook 52 is formed (see FIG. 3). This curved hook forms an excellent mechanical connection between core 16 and facing 14.

The tang shape, height, angle of projection, orientation, and surface density (number of tangs per square inch) can be optimized for a particular application. Also, the operating thickness range of the resultant composite gasket 10 can be made to cover the majority of cylinder head applications— light duty as well as heavy duty combustion engines.

An important aspect of the present invention is the fact that the forming of tangs 20 does not result in a perforation which passes through core 16. While it is true that a small divot 28 is formed by gouging metal from the surface of core 16, this divot does not penetrate through thickness 30. Thus, the integrity of core 16 is maintained and its ability to prevent the passage of fluids therethrough is not compromised.

Additional features of the present invention are easily seen from FIGS. 1–3 and include:

1. The overall thickness 32 of composite gasket 10 can be easily varied by varying the thickness of only core 16.

2. The ability to minimize the thinness of facings 12, 14 by lowering the height 22 of tangs 20 is achieved with a simple adjustment of the fabrication equipment.

3. The present invention increases the radial strength of the composite gasket which is needed in cylinder head gasket applications requiring the support of combustion fire ring 34.

4. Because this composite gasket fabrication technique does not introduce perforations which pass through metal core 16, there is no possibility of leakage through the core.

Figure 5:
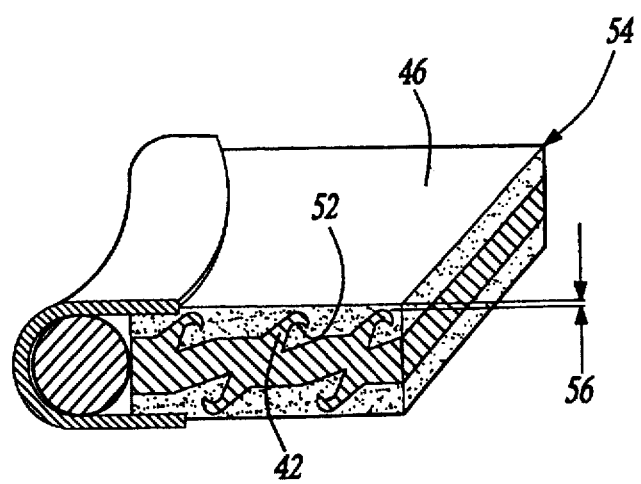
FIG. 5 is a partial assembled view of the second embodiment of the composite gasket shown in FIG. 4.

Now referring to FIGS. 4 and 5, in a second embodiment of the composite gasket of the present invention, height 40 of tang 42 is less than thickness 44 of non-metallic facing 46. Thus, when facing 46 is pressed onto core 50, the resultant structure shown in FIG. 5 is achieved. Note that because the height 40 of tangs 42 is less than thickness 44, the hooked portions 52 of tang 42 do not puncture the surface 54 of non-metallic facing 46 but rather reside hidden below 56 surface 54. The application of a roll combiner or platen to assemble the embodiment of the present invention shown in FIGS. 4 and 5 is the same as that described in conjunction with the embodiments shown in FIGS. 1–3.

Preferred embodiments of the present invention have been disclosed. A person or ordinary skill in the art would realize however that certain modifications would come with the teachings of this invention. Therefore, the following claims should be studied to determine the true scope and content of the invention.

What is claimed is:

1. A composite gasket, comprising:

facing material having at least one mating surface, a non-perforated core for fastening against said mating surface of said facing material, wherein said non-perforated core includes an upper surface layer, a lower surface layer, and a middle core layer;

wherein at least one of said upper and lower surface layers of said non-perforated core includes generally planar portions and tanged portions that extend beyond said generally planar portions of said non-perforated core and into said facing material, wherein said tanged portions are formed only from outwardly displaced material in said at least one surface layer.

2. The composite gasket of claim 1, wherein said facing is comprised of non-metallic material and said non-perforated core is comprised of metal.

3. The composite gasket of claim 1, wherein said tanged portions have tangs that include a hooked end portion.

4. The composite gasket of claim 1, wherein said tanged portions have tangs that are angled at an acute angle relative to said planar portions.

5. The composite gasket of claim 4, wherein said tangs are oriented in a same direction.

6. The composite gasket of claim 4, wherein said tangs are oriented in opposing directions.

7. A method of forming a composite gasket including a core portion and a facing portion, comprising the steps of:

(a) outwardly displacing only material on a surface layer of said core portion to form a plurality of tang portions without forming a resulting perforation which passes through said core portion, and (b) pressing said facing portion against said plurality of said tangs such that said tangs penetrate said facing portion and clinch said facing portion to said core portion.

8. The method of claim 7, wherein said pressing of step (b) is done with sufficient force to form a hook in an end portion of said plurality of tangs.

9. A composite head gasket of the type used in internal combustion engines, comprising:

a sheet of metallic, non-perforated core material having first and second opposing surfaces, a first sheet of non-metallic facing material abutting said first surface of said core, a second sheet of non-metallic, facing material abutting said second surface of said core, wherein said first and second surfaces of said core include a plurality of tanged portions which extend beyond their respectively associated first and second core surfaces and also extend into their respectively associated first and second sheets of non-metallic facing material, wherein said plurality of tangs are asymmetrical in shape formed only from material in said first and second surfaces and each include an end which is generally hook shaped.

10. The composite head gasket of claim 9, wherein said hook portions of said tangs pass through their respectively associated sheet of non-metallic facing material.

11. The composite head gasket of claim 9, wherein said hook portions of said tangs do not extend completely through their respectively associated sheet of non-metallic facing material.

12. The composite head gasket of claim 9, further including a combustion fire ring attached to said gasket by way of a metallic flange.

13. The composite head gasket of claim 9, wherein said hook shaped ends of said plurality of tanged portions are pointed.

* * * * *